Nov. 28, 1944.  C. W. SINCLAIR  2,363,902
WHEEL
Filed May 11, 1942
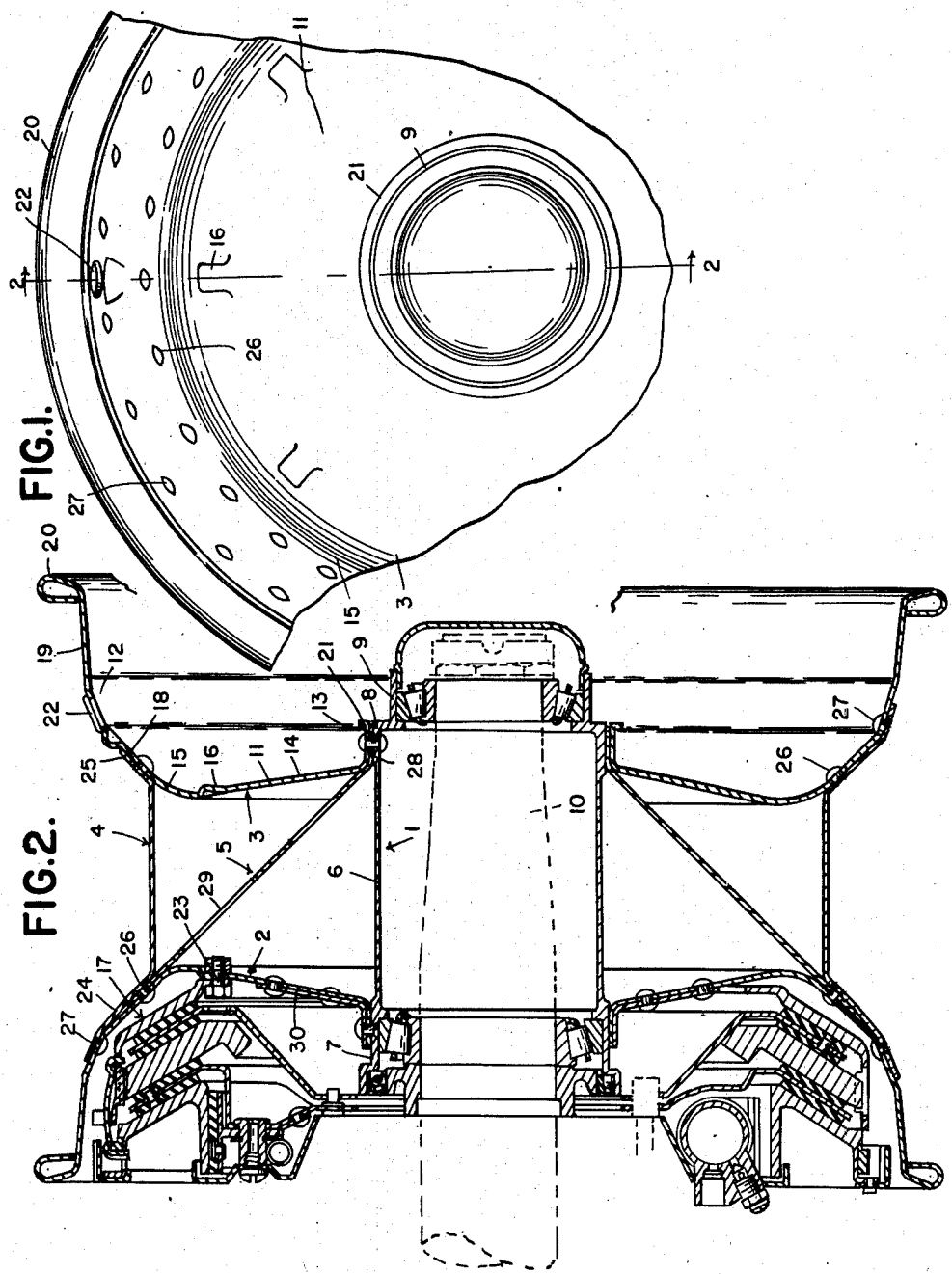
INVENTOR.
CHARLES W. SINCLAIR
BY
ATTORNEYS Patented Nov. 28, 1944

2,363,902

UNITED STATES PATENT OFFICE 2,363,902

WHEEL

Charles W. Sinclair, Detroit, Mich., assignor to Kelsey-Hayes Wheel Company, Detroit, Mich., a corporation of Delaware Application May 11, 1942, Serial No. 442,499

2 Claims. (Cl. 301—6)

The invention relates to wheels and refers more particularly to wheels of that type adapted to receive tires of relatively large cross sections.

The invention has for an object to so construct the wheel that it is of relatively light weight and has the necessary strength to withstand the radial and axial thrusts to which it may be subjected in use and may be formed of sheet metal.

The invention has for other objects to so construct the wheel that it provides sufficient space within the confines of the tire carrying rim to receive a powerful brake with clearance between the rim and brake; and to so construct the wheel that it can readily withstand the braking torque.

With these and other objects in view, the invention resides in the novel features of construction and combinations and arrangements of parts as more fully hereinafter set forth.

In the drawing:

Figure 1 is a side elevation of a wheel embodying the invention;

Figure 2 is a cross section on the line 2—2 of Figure 1.

The wheel is designed particularly for use on airplanes and comprises the hub 1, the inboard and outboard side elements 2 and 3, respectively, mounted on and fixedly secured to the hub, the annulus 4 mounted on and fixedly secured to the side elements and forming with the radially outer portions thereof a tire carrying rim, and the reinforcing element 5 extending between and secured to the side elements. The hub 1 is formed of steel and preferably from a circular sheet steel blank by a series of drawing and upsetting and machining steps. The hub 1 is tubular and has the reduced central portion 6, the enlarged inboard and outboard portions 7 and 8, respectively, at the ends of the central portion, and the reduced outboard end portion 9. Suitable anti-friction bearings are arranged within the portions 7 and 9 for mounting the wheel upon the axle 10.

Each of the inboard and outboard side elements 2 and 3 is in the nature of a sheet steel disc preferably formed by die-pressing flat circular steel blanks. Each element has a generally radially extending body portion 11 and a rim portion 12 integral with the body portion. Each body portion 11 has a central axial part 13 fixedly secured to one of the enlarged portions 7 and 8 of the hub, a main part 14, and a peripheral flared part 15. The main parts of the body portions converge radially outwardly and the peripheral parts diverge radially outwardly. Each main part is formed with an annular series of bosses 16 for attachment to a rotatable part of the brake 17.

The rim portions 12 diverge radially outwardly from the peripheral parts 15 and each rim portion is formed with a flared part 18 connecting integrally into a peripheral part, a generally axial bead seat 19 extending from the flared part 18, and a generally radial hollow tire retaining flange or bead 20 extending from the bead seat 19. The construction of each of the side elements as thus far described is the same. They differ specifically in forming the outboard side element with the terminal radial flange 21 on the central axial part 13 and with the valve stem hole 22 in the flared part 18. Also, the bosses 16 of the inboard side element are apertured for the passage of the bolts 23 used in mounting the brake 17 on the wheel, it being noted that the rim portion of the inboard side element is of a size and arranged so that a clearance space is provided between the same and the brake.

The annulus 4 is made of sheet steel and is endless and has the flared inboard and outboard end portions 24 and 25 secured to the flared parts 18 of the side elements by the annular series of rivets 26 and 27. The annulus cooperates with the rim portions 12 to form a drop-center tire carrying rim.

The reinforcing element 5 is made of sheet steel and is dished, or of generally conical section, and it extends between and is connected to the flared part 18 of the inboard side element 2 and the inner edge and, more specifically, the central axial part 13 of the outboard side element 3. The angle of the dished or generally conical portion is the same as that of the flared part 18 of the inboard side element so that its radially outer attachment portion fits the flared part 18 and is readily secured between this flared part and the flared end portion 24 of the annulus by the rivets 26, it being noted that the flared end portion 24 extends beyond the reinforcing element and is secured by the rivets 27. The reinforcing element is preferably formed with the cylindrical attachment portion 28 which fits between the enlarged hub portion 8 and the central axial part 13 of the outboard side element and is fixedly secured to these parts by the rivets which secure the outboard side element to the hub. The dished or generally conical portion of the reinforcing element is preferably provided with the holes 29 for decreasing the weight.

With this construction, the reinforcing element provides the necessary reinforcement for the wheel to withstand the radial and axial thrusts to which the wheel may be subjected in use. Also, the dished reinforcing element, it will be noted, is secured to the inboard side element of the wheel in a zone near the zone of attachment of this element to the brake and serves to reinforce the wheel so that it can readily withstand the torque resulting from the application of the brake.

To further reinforce the wheel, there is the disc-like sheet steel element 30 secured to the main part 14 of the inboard side element by suitable means, such as rivets, and overlying the central axial part of this inboard side element and secured to the wheel hub by the rivets which secure the inboard side element to the hub.

With the above construction a relatively light weight sheet metal or sheet steel wheel is provided having the necessary strength to withstand radial, axial, and braking thrusts to which it may be subjected in use, and the weight of this wheel is but slightly more than that of a wheel made of aluminum or aluminum alloy of the same type and size.

What I claim as my invention is:

1. A wheel comprising axially spaced sheet metal side elements each formed of a wheel body portion and an integral tire carrying rim portion having a flared part connecting directly into said body portion, a generally axial bead seat and a tire retaining bead, said body portion and rim portion of one of said side elements providing a space for receiving a brake and said last mentioned body portion having a part adjacent said flared part of said last mentioned rim portion for attachment to the brake, a sheet metal reinforcing element of generally conical section having a portion extending over and secured directly to said last mentioned flared part and terminating short of said bead seat of said last mentioned rim portion, said reinforcing element extending to and having a portion secured directly to the inner zone of the other of said side elements, a sheet metal annulus having flared end portions extending over and secured to said first mentioned portion of said reinforcing element and said flared part of said other of said side elements, said flared end portions terminating short of said bead seats of both of said side elements and a hub extending between and secured to said side elements.

2. A wheel comprising axially spaced sheet metal side elements each formed of a wheel body portion and an integral tire carrying rim portion having a flared part connecting directly into said body portion and a second part extending from said flared part for receiving a tire bead, said body portion and rim portion of one of said side elements providing a space for receiving a brake and said last mentioned body portion having a part adjacent said flared part of said last mentioned rim portion for attachment to the brake, a sheet metal reinforcing element of generally conical section having a portion extending over and secured directly to said last mentioned flared part, said reinforcing element extending to and having a portion secured directly to the inner zone of the other of said side elements, a sheet metal annulus having flared end portions extending over and secured to said first mentioned portion of said reinforcing element and said flared part of said other of said side elements, said flared end portions terminating short of said second parts, and a hub extending between and secured to said side elements.

CHARLES W. SINCLAIR.